Patented Aug. 1, 1944

2,354,892

UNITED STATES PATENT OFFICE 2,354,892

DEHYDROGENATION OF HYDROCARBONS

Carlisle M. Thacker, Toledo, Ohio, assignor to The Pure Oil Company, Chicago, Ill., a corporation of Ohio No Drawing. Application December 18, 1937, Serial No. 180,531

3 Claims. (Cl. 260—683.3)

This invention relates to dehydrogenation of low boiling hydrocarbons and is more particularly concerned with catalysts and method for converting paraffinic hydrocarbon gases into unsaturated hydrocarbons of the olefinic type.

Various catalysts have been tried and the prior art and literature disclose a number of catalysts useful in dehydrogenation of hydrocarbons. Known catalysts are unsatisfactory, however, for the reason that the amount of conversion produced thereby is not sufficiently high to warrant commercial use; or the efficiency of the catalysts is so low that undesirable products, such as coke, are produced in large quantities in addition to the desirable unsaturated hydrocarbons; or the life of the catalyst is too short.

I have discovered that dehydrogenation of low boiling saturated hydrocarbon gases can be effected with a high percentage of conversion and high efficiency of conversion by using a catalyst containing a difficultly reducible metallic oxide gel, which possesses extended surfaces and a highly adsorptive capacity for gas, and a metal, metal oxide or compound, which in combination with the gel imparts thereto the selective property of dehydrogenating hydrocarbons. When a catalyst containing components of these two classes is used, the results obtained are entirely unexpected since neither component alone will produce results even closely approaching that of the combined components.

In accordance with my invention, the activated alumina may be prepared by precipitating the tri-hydrate from an aluminate solution and calcining the precipitate at temperatures of from 300° to 800° C. The methods of preparation are fully set forth in the patents to Barnitt, No. 1,868,869 and Derr, No. 2,015,593. A well known activated alumina is that sold by the Aluminum Ore Company under the trade-name "Alorco" (Grade A). The alumina gel sold under this trade-mark has a large surface which makes it particularly active when used in conjunction with mild dehydrogenating catalysts.

As metals and oxides that may be used in combination with the gel, are:

a. Readily reducible metals of group I of the periodic table, such as copper, silver and gold;

b. Oxides of metals of group II of the periodic table, such as beryllium, magnesium and zinc;

c. Oxides of difficultly reducible metals of groups V, VI and VII of the periodic table, such as vanadium, chromium, tungsten, molybdenum and manganese.

Combinations of the aforementioned metals and oxides in conjunction with the gel may be used. For example good results are obtained by depositing copper tungstate or magnesium and chromium compounds on activated alumina. Dehydrogenating catalysts such as iron, cobalt and nickel have been tried in conjunction with activated alumina, but these catalysts are unsatisfactory for the reason that they tend to decompose the hydrocarbons into coke and hydrogen instead of simply splitting off hydrogen to form olefins.

The catalyst in accordance with my invention is preferably prepared by mixing salt solutions of the desired metal or metals with the activated alumina and heating the mixture with frequent stirring until almost dry and then completing the drying slightly above the boiling point of water. The dry catalyst is then decomposed by contacting it with air at a high temperature in order to convert the metallic compound to oxide. The catalyst is finally heated with hydrogen, or other reducing gas, at elevated temperature for a prolonged period of time and is then ready for use.

Gases such as ethane, propane and butane or mixtures thereof may be dehydrogenated by subjecting the gas to contact with the catalyst at temperatures ranging from 350°–750° C. With the higher boiling hydrocarbons such as butane the temperature required for dehydrogenation is lower than the temperature required for dehydrogenation of propane or ethane and similarly the temperature of dehydrogenation of propane is intermediate between that of butane and ethane. If it is desired to dehydrogenate a mixture of the gases, the optimum temperature will depend upon the relative proportions of the several constituents in the mixture, but in any case will lie somewhere between the optimum temperatures for the individual constituents.

The dehydrogenation may be carried out in conventional apparatus at pressures atmospheric, sub-atmospheric or super-atmospheric. The gas is preferably preheated to the conversion temperature prior to charging it to the reactor containing the catalyst. The reactor is preferably heated to maintain it at all times at conversion temperature. The gas is preferably dried prior to contacting it with the catalyst since the presence of water vapor or steam materially affects the efficiency of the catalyst, causing a lower amount of conversion to take place.

In order to more clearly understand the manner in which the catalyst is prepared, the following examples are given:

Example 1

Electrolytic copper foil (12.5 grams) was dissolved in concentrated nitric acid (50 c. c.) and water (100 c. c.). After filtering, concentrated nitric acid (100 c. c.) was added and the solution was heated to boiling. The boiling copper nitrate solution was then added to activated alumina (400 grams) that had been heated for 30 minutes at 130° C. The mixture was evaporated almost to dryness with frequent stirring and then cooled. To the cooled mixture was added a sufficient amount of ammonium hydroxide solution to completely cover the impregnated alumina and neutralize the acidity of the material. After standing over night, the mixture was evaporated to dryness with frequent stirring and further heated at 110° C. for 8 hours in an electric oven to complete the drying operation. The dry catalyst was then decomposed in air by raising the temperature to 550° C. over an 8-hour period and then holding the temperature at 550° C. for 8 hours. After cooling, the catalyst was screened to obtain particles of 8 to 14 mesh size, and this material was then heated in a stream of hydrogen at 300° C. for 3 hours. The catalyst was then ready for use.

Example 2

Chromic acid (19.6 grams) was dissolved in water (100 c. c.) and added to activated alumina (400 grams) that had previously been heated at 110°–120° C. for 2 hours. The mixture was well stirred and then dried over night in an electric oven at 110°–120° C. The dry material was screened through an 8 to 14 mesh sieve and reduced in a stream of methanol and hydrogen by gradually increasing the temperature to 250° C. over a period of 1 to 2 hours and then continuing the reduction at 250° C. for 2 hours. The catalyst was then heated for 15 hours in dry hydrogen at 450° C., after which it was ready for use in the dehydrogenation of hydrocarbons.

Example 3

Magnesium carbonate (25.3 grams) was dissolved in a solution (150 c. c.) consisting of chromic acid (30 grams), glacial acetic acid (30 c. c.), and the balance water. This solution was added to activated alumina (400 grams) which had previously been heated to 120° C. for 2 hours. The mixture was partly dried in a water bath with frequent stirring and the drying was completed in an electric oven at 120° C. The dried catalyst was then screened through an 8 to 14 mesh sieve and reduced in the same manner described in connection with Example 2.

It is to be understood that the foregoing examples are given by way of illustration and that the amounts of materials and the temperature at which the several steps are carried out may be varied within wide limits. Moreover, other sorts of metals may be used in preparing the catalysts.

The following examples are actual results obtained in using catalysts in accordance with my invention:

Example 4

A gas consisting mainly of ethane with a small amount of impurities was contacted with a catalyst consisting of chromium oxide deposited on activated alumina prepared in accordance with Example 2, at a temperature of 600° C. and at a space velocity of 521. The gas was dried prior to contact with the catalyst by passing it through calcium sulfate. The reaction gases were analyzed and showed an ethylene content of 13.8% and a hydrogen content 18.5%. The yield of ethylene per cubic foot of charging gas was 14% and methane formation was practically negligible.

Example 5

Another run was made using the same gas and same catalyst with the exception that the gas was saturated with water vapor at room temperature. At a temperature of 550° C. and a space velocity of 515, the reaction gases contained only 3.4% of ethylene and 1.8% of hydrogen. The yield of ethylene based on the charging gas was 1%. A run made under substantially the same conditions with dry gas produced 9.2% of ethylene and 8.2% of hydrogen with a yield of 7.5%, thus showing the detrimental effect of water vapor.

Example 6

A catalyst prepared in accordance with Example 3 containing magnesium and chromium in the proportion of 1:1 deposited on activated alumina (40 parts of alumina to 1 part of Mg-Cr) was contacted with dry ethane at a temperature of 550° C. and at a space velocity of 505. The reaction gases showed an ethylene content of 9.5% and a hydrogen content of 8%. The yield of ethylene based on the charging gases was 7.4%. No carbon or methane was formed. The same gas treated at 600° C. at the same space velocity produced a product containing 11.5% of ethylene and 12.4% of hydrogen, with a yield of 9.5%. There was no evidence of carbon or methane formation at this higher temperature.

Example 7

Dry ethane was contacted with a catalyst prepared by depositing copper on activated alumina, in accordance with Example 1, at a temperature of 675° C. and a space velocity of 350. The reaction gases contained 19.6% ethylene and 31.4% of hydrogen. The yield of ethylene based on charging gas was 26.4%. A slight amount of side reaction took place, producing a little carbon and methane. When the same catalyst was used to treat ethane saturated with water vapor at 0° C., a temperature of 650° C. and a space velocity of 374, the reaction gases contained only 5.1% ethylene and 6.4% hydrogen, with a yield of 4.3%. No carbon or methane was formed under these conditions.

Example 8

Dry ethane was contacted with a catalyst consisting of zinc oxide on or combined with activated alumina at a temperature of 685° C. and a space velocity of 347. The reaction gases contained 10.5% of ethylene, 12.4% of hydrogen, and gave a yield of 9.8% of ethylene based on the charging gas. The carbon formation was negligible, although there was some evidence of side reaction shown by methane formation.

Example 9

In this run dry ethane was contacted with a catalyst consisting of activated alumina only at a temperature of 600° C. and a space velocity of 165. The reaction gases obtained only 1% of ethylene and 1.1% of hydrogen.

In the examples given above, space velocity is defined as volume of gas entering converter per hour at 0° and at 760 mm. pressure per unit volume of reacting space. The runs were all conducted at substantially atmospheric pressure.

Example 10

Normal butane (dry) was contacted at 500° C. and at a space velocity of 625 with a catalyst prepared in accordance with Example 2 in which the ratio of alumina to chromium was 20 to 1. The run was continued for 26 hours. The activity of the catalyst increased during the first seven hours and then remained constant during the remainder of the run. The yield of unsaturates was 10.4% by volume.

Immediately following this run another run of four hours' duration was made at 525°–536° C. and space velocity of 625. The yield of unsaturates under these conditions was 16.8%. No change in activity of the catalyst occurred and the carbon formation was negligible.

A number of runs were made to determine the effect of various catalysts given in the above examples when not supported on activated alumina. The results of these runs are given in the table below:

Table

| Catalyst | Temperature | Space vel. in cu. ft. of gas/hr. per cu. ft. of reacting space | Ethylene in reaction gases | Hydrogen in reaction gases | Yield |
| --- | --- | --- | --- | --- | --- |
| | °C. | | | | |
| Chromium oxide | 600 | 337 | 2.6 | 2.3 | |
| | 675 | 337 | 3.8 | 2.8 | 1.4 |
| Magnesium oxide-chromium oxide (1:1) | 673 | 334 | 4.8 | 3.5 | 2.7 |
| | 700 | 337 | 8.4 | 6.5 | 7.3 |
| Magnesium oxide-chromium oxide (1:3) | 700 | 337 | 9.2 | 6.6 | 7.5 |
| Copper | 675 | 341 | 3.1 | 2.8 | 0.7 |

In each case the catalyst was supported on pumice except in the case of copper, and in that case the copper was unsupported.

These results clearly show that the activity of the oxides and the gel when used separate is far below the activity of the combined catalysts and that the activity of the combined catalysts is far greater than the additive result of the two. In the case of magnesium oxide-chromium oxide, although the yield appears to be as good as the yield obtained when the catalyst was supported on the alumina gel, the activity of the catalyst actually was far less when not supported on the gel because in the latter case, the temperature of contact was 700° as against 550° in the run where catalyst was supported on the alumina gel and the space velocity was much less in the case of the catalyst which was not supported on the gel. Increase in reaction temperature greatly increases the reaction and likewise decrease of space velocity increases time of contact, and consequently, the amount of conversion. As a matter of fact, when the gas was contacted with the gel-supported catalyst at 600° C. and a space velocity of 505, the yields were greater than those obtained at 700° and 337 space velocity with the unsupported catalyst.

In all cases in which the catalyst was supported on the alumina gel, the efficiency was approximately 80% or better and the catalyst maintained its activity over the entire period of the run without showing any loss in activity.

The invention is not limited to dehydrogenation of gases at the space velocities given in the specific examples but the space velocities may be varied over a wide range of approximately 150 to 10,000, depending upon the gas treated and the temperature of treatment. Generally speaking, high space velocities may be used with the higher boiling gases and with high temperatures, while the lower space velocities will be preferable with low boiling gases and with lower temperature ranges. With gas mixtures, the space velocities will preferably be intermediate between the upper and lower limits.

As has previously been said, catalysts prepared in accordance with my invention retain their activity for longer periods of time than catalysts which have hitherto been tried. In the case of chromium, copper and copper tungstate in combination with alumina, the activity of the catalyst actually increases gradually for a time when in use.

The structure of the metal or oxide deposited on the alumina is immaterial. No effort is made to deposit the metal or oxide in any particular form so long as it is evenly distributed over the alumina support. The methods used to deposit the metals or oxides on the alumina are not conducive to gel formation thereof.

The catalysts can be easily reactivated after their activity has fallen off, by heating in air, and reducing with hydrogen in the case of metallic substances such as copper. A catalyst prepared from chromic acid and activated alumina in the proportion of $200Al_2O_3:1Cr$ was completely restored by heating in air for 16 hours at 420° C. and at 550° C. for 2 hours.

What I claim is:

1. The method of selectively dehydrogenating dehydrogenatable low boiling hydrocarbons which comprises contacting said hydrocarbons at reacting temperatures with catalyst comprising "activated alumina" impregnated with tungsten oxide prepared by mixing "activated alumina" made by precipitating the trihydrate of alumina from an aluminate solution and calcining the precipitate at temperatures between 300 and 800° C., with a solution of a tungsten salt, and decomposing the tungsten salt admixed with the "activated alumina" to tungsten oxide.

2. Method in accordance with claim 1 in which the low boiling hydrocarbons comprise gaseous paraffinic hydrocarbons having at least two carbon atoms per molecule.

3. Method in accordance with claim 1 in which the reacting temperature is between 350 and 750° C.

CARLISLE M. THACKER.